United States Patent [19]
Brody

[11] Patent Number: 5,495,613
[45] Date of Patent: Feb. 27, 1996

[54] METHOD AND APPARATUS FOR EXTENDING THE CAPABILITY OF A SYSTEM EDITOR USING HIGH-LEVEL LANGUAGE TRANSFORMS

[75] Inventor: Ronald E. Brody, Exton, Pa.

[73] Assignee: Unisys Corporation, Blue Bell, Pa.

[21] Appl. No.: 292,613

[22] Filed: Aug. 18, 1994

[51] Int. Cl.$^6$ .................................................. G06F 3/00
[52] U.S. Cl. .................. 395/700; 364/280.7; 364/226.6; 364/DIG. 1
[58] Field of Search ...................................... 395/600, 700; 364/419

[56] References Cited

U.S. PATENT DOCUMENTS

| 4,827,410 | 5/1989 | Corren | 395/155 |
| 4,908,612 | 3/1990 | Bromley et al. | 340/706 |
| 5,043,891 | 8/1991 | Goldstein et al. | 364/419 |

OTHER PUBLICATIONS

Alan Simpson, "Mastering WordPerfect 5.1 & 5.2 for Windows" Sybex Inc., pp. 511–521, 874–906, 1993.

Primary Examiner—Thomas G. Black
Assistant Examiner—Peter Y. Wang
Attorney, Agent, or Firm—Ratner & Prestia

[57] ABSTRACT

The present invention is directed to a technique extending the commands, and consequently, the capability of a system editor. Rather than extending the editor with existing editor commands, as in the use of macros, the present invention enables the user to extend the editor using new commands, called transforms. The transforms are written in a standard high level language such as ALGOL, C, COBOL, FORTRAN, or PASCAL. A transform is a new type of command that may be added to a system editor. The transform command is created, compiled, and then stored in a library. When the command is called, an interface in the system editor provides access to the transforms in the library. Transforms are designed so that, to the user, they operate like normal editor commands.

12 Claims, 19 Drawing Sheets

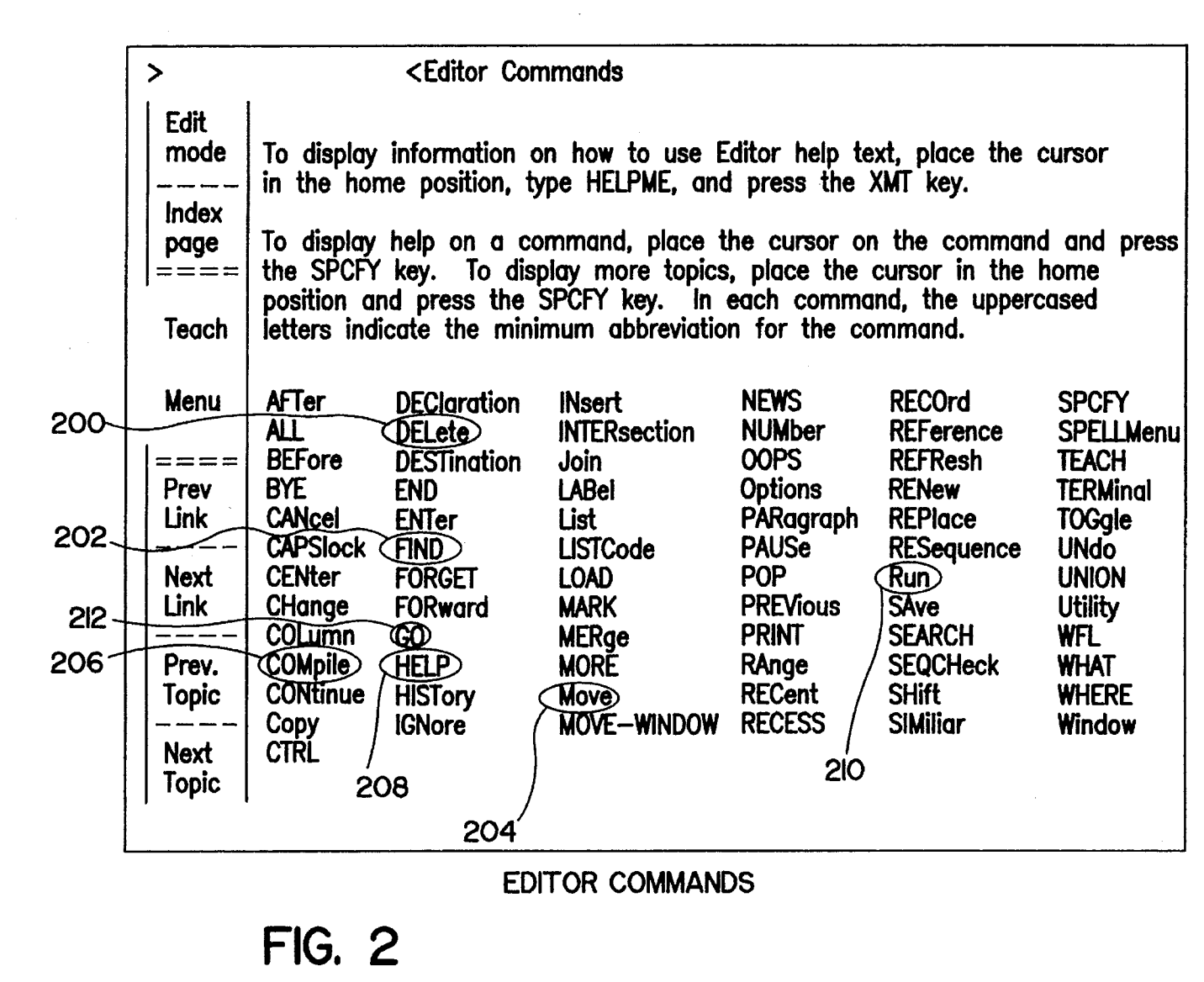

> <Editor Commands

| | |
|---|---|
| Edit mode | To display information on how to use Editor help text, place the cursor in the home position, type HELPME, and press the XMT key. |
| Index page | |
| Teach | To display help on a command, place the cursor on the command and press the SPCFY key. To display more topics, place the cursor in the home position and press the SPCFY key. In each command, the uppercased letters indicate the minimum abbreviation for the command. |

| Menu | AFter | DEClaration | INsert | NEWS | RECOrd | SPCFY |
|---|---|---|---|---|---|---|
| | ALL | DELete | INTERsection | NUMber | REFerence | SPELLMenu |
| | BEFore | DESTination | Join | OOPS | REFResh | TEACH |
| Prev Link | BYE | END | LABel | Options | RENew | TERMinal |
| | CANcel | ENTer | List | PARagraph | REPlace | TOGgle |
| | CAPSlock | FIND | LISTCode | PAUSe | RESequence | UNdo |
| Next Link | CENter | FORGET | LOAD | POP | Run | UNION |
| | CHange | FORward | MARK | PREVious | SAve | Utility |
| | COLumn | GO | MERge | PRINT | SEARCH | WFL |
| Prev. Topic | COMpile | HELP | MORE | RAnge | SEQCHeck | WHAT |
| | CONtinue | HIStory | Move | RECent | SHift | WHERE |
| Next Topic | Copy | IGNore | MOVE-WINDOW | RECESS | SIMiliar | Window |
| | CTRL | | | | | |

EDITOR COMMANDS

FIG. 2

The MACROS file is (ROM)EDITOR/MACROS/TEXTDATA ON LANG.

| DEMO | STARTUP | REPAR | OMNI | OMNIHELP |
| HELPONLY | ZOT | COUNT | MEMO | PRINTX |
| SAVEX | LISTX | SI | DEF | DEFO |
| MARKX | FF | FX | PUT | MKST |
| RX | SUN | UNMARK | MARKDATE | RETRY |
| TEACH | INS | APPEND | DUP | REPX |
| BACK | LOG | ASK | CRTL99 | CTRL11SPCFY |
| CTRL12SPCFY | CTRL61SPCFY | CTRL62SPCFY | CTRL67SPCFY | CTRL68SPCFY |
| CTRL69SPCFY | CTRL74SPCFY | CTRL84SPCFY | CTRL93SPCFY | CTRL95SPCFY |
| RR | DATEMARK | BLOT | MMDDYY | UPCASE |
| DOWNCASE | MCOL | RAILROAD | HELPTEXT | PLAINTEXT |

300

Push SPCFY or IMT.

WHAT MACROS

FIG. 3a

```
> FF (a user defined macro)

Edit      #DEF FF (TARGET) : OPT
mode      ]GO BEGINNING
—|—|—     ]+F <TARGET>
Index     #%   ===============   FIND FIRST   =============== FF
page
====

Teach

Menu

=|=|=
Prev
Link
—|—|—
Next
Link
—|—|—
Prev.
Topic
—|—|—
Next
Topic (End of Topic)
```

FF MACRO

FIG. 3b

```
< MACUPCASE (a user defined macro)
#DEF MACUPCASE <GROUP>.   ──400
|rep <GROUP> "a" "A"      ──402
|rep <GROUP> "b" "B"
|rep <GROUP> "c" "C"
|rep <GROUP> "d" "D"
|rep <GROUP> "e" "E"
|rep <GROUP> "f" "F"
|rep <GROUP> "g" "G"
|rep <GROUP> "h" "H"
|rep <GROUP> "i" "I"
|rep <GROUP> "j" "J"
|rep <GROUP> "k" "K"
|rep <GROUP> "l" "L"
|rep <GROUP> "m" "M"
|rep <GROUP> "n" "N"
|rep <GROUP> "o" "O"
|rep <GROUP> "p" "P"
|rep <GROUP> "q" "Q"
|rep <GROUP> "r" "R"
|rep <GROUP> "s" "S"
|rep <GROUP> "t" "T"
|rep <GROUP> "u" "U"
|rep <GROUP> "v" "V"
(Continued)
>
```

| Edit mode |
| Index page |
| Teach |
| Menu |
| Prev Link |
| Next Link |
| Prev. Topic |
| Next Topic |

MACUPCASE MACRO

FIG. 4a

```
25000000
25020000     REAL PROCEDURE UPCASE (CMD,REC);
25020200       VALUE CMD;
25020400       REAL CMD;
25020600       EBCDIC ARRAY REC [*];
25020800     BEGIN
25021000       POINTER P;
25021200       INTEGER N;
25021250         BUGC("UPCASE" HBUG("CMD",CMD)
25021300             PBUG("REC",REC[TEXTSTART],TEXTLENGTH));
25021400       SCAN P:REC[TEXTSTART] FOR N:TEXTLENGTH UNTIL IN LOWER;
25021600       IF N > 0 THEN
25021800       BEGIN
25022000         OPN := OPN + 1;
25022200         REPLACE P BY P FOR N WITH UPCAST;
25022400         UPCASE := 1 & CB_CHANGED CB_DISPOSITION;
25022600       END ELSE
25022800         UPCASE := 1 & CB_UNCHANGED CB_DISPOSITION;
25022850       BUGZ(HBUG("UPCASE",UPCASE:=*)
25022900           PBUG("REC",REC(TEXTSTART),TEXTLENGTH));
25023000     END UPCASE;
25023200
```

FIG. 4b

```
25023200
25060000  REAL PROCEDURE MCOL;
25060200  BEGIN
25060400    REAL CMD;
25060600    INTEGER X, COL, GUT, I, J, K, LM, MAXL, N, RM, W;
25060800    BOOLEAN RD, SORTING, ACROSS;
25061000    POINTER IP, P, R;
25061200    EBCDIC ARRAY ITEMS [0:599];
25061400    ARRAY ITEMX [0:128];
25061450    LABEL ERRXIT;
25061500    DEFINE MYNAME = MCOL#;
25061600    DEFINE F(I, J) =
25061800      (IF SORTING AND NOT ACROSS THEN J + I*L ELSE (J-I)*COL + I + 1)#;
25062000    DEFINE OPT_SORT   = 1#,
25062200           OPT_LM     = 2#,
25062400           OPT_RM     = 3#,
25062600           OPT_COL    = 4#,
25062800           OPT_GUT    = 5#,
25063000           OPT_NUM    = 9#;
25063200    VALUE ARRAY OPTS (OPT_SORT,       80"1SORT",
25063400                      OPT_LM,         80"2LM",
25063600                      OPT_LM,         80"5LEFTMARGIN",
25063800                      OPT_RM,         80"2RM",
25064000                      OPT_RM,         80"6RIGHTMARGIN",
25064200                      OPT_COL,        80"3COLUMNS",
25064400                      OPT_GUT,        80"3GUTTER",
25064600                      OPT_NUM,        80"1   ");
25064800    DEFINE OPT_DOWN   = 1#;
25065000           OPT_ACROSS = 2#;
25065200    VALUE ARRAY OSRT (OPT_DOWN,       80"1DOWN",
25065400                      OPT_ACROSS,     80"1ACROSS");
25065600    BOOLEAN PROCEDURE CMP (X, Y); VALUE X, Y; REAL X, Y;
25065800      CMP := ITEMS[X] \ ITEMS[Y] FOR MAXL;
25066000
25066100    BUGX("MCOL");
25066200    RM := TEXTLENGTH;
25066400    IF Q = ":" THEN
25066600    BEGIN
25066800      DO BEGIN
25067000        SCAN Q:Q+1 FOR L:L-1 WHILE = " ";
25067200        CASE LOOKUP (Q, L, OPTS, VAL, CINWITH) OF
25067400        BEGIN
25067600          OPT_SORT: SORTING := TRUTH(Q, L);
25067800                    IF SORTING THEN
25068000                      CASE LOOKUP (Q, L, OSRT, VAL, CINWITH) OF
25068200                      BEGIN
25068400                        OPT_ACROSS: ACROSS := TRUTH(Q, L);
25068600                        OPT_DOWN:   ACROSS := NOT TRUTH(Q, L);
25068800                        ELSE:
25069000                      END;
```

FIG. 5a

```
25069200         OPT_LM:    IF Q = "*" THEN
25069400                    BEGIN
25069600                      LM := 0;
25069800                      SCAN Q:Q+1 FOR L:L-1 WHILE = " ";
25070000                    END ELSE
25070200                    IF LOOKUP (Q, L, OPTS, LM, CINWITH) = OPT_NUM THEN
25070400                    BEGIN
25070600                      IF NOT (I <= LM AND LM < RM) THEN
25070800                        ERRX("Number out of range");
25071000                    END ELSE
25071200                      ERRX("Number expected");
25071400         OPT_RM:    IF LOOKUP (Q, L, OPTS, RM, CINWITH) ~= OPT_NUM THEN
25071600                      ERRX("Number expected");
25071800                    IF NOT (LM < RM AND RM <= TEXTLENGTH) THEN
25072000                      ERRX("Number out of range");
25072200         OPT_COL:   IF LOOKUP (Q, L, OPTS, COL, CINWITH) ~= OPT_NUM THEN
25024000                      ERRX("Number expected");
25072600         OPT_GUT:   IF LOOKUP (Q, L, OPTS, GUT, CINWITH) ~= OPT_NUM THEN
25072800                      ERRX("Number expected");
25073000         ELSE:      ERRX("Unrecognized option");
25073200         END;
25073400       END UNTIL Q ~= ",";
25073600    END;
25073800    IF L > 0 THEN
25074000      ERRX("End of command expected");
25074200    IF RECS > 0 THEN
25074400    BEGIN
25074600      REPLACE IP:ITEMS BY 48"00";
25074800      X := 0;
25075000      WHILE NOT (RD := INP (CMD, BUF)) DO
25075200      BEGIN
25075400        RD := OUTP (1 & CB_DELETED CB_DISPOSITION, BUF);
25075500        IF RD THEN RETURN(REAL(RD));
25075600        SCAN P:BUF[TEXTSTART] FOR N:TEXTLENGTH WHILE = " ";
25075800        IF LM = 0 THEN
25076000          LM := TEXTLENGTH - N + 1;
25076200        WHILE N > 0 DO
25076400        BEGIN
25076600          X := X + 1;
25076800          IF X = SIZE(ITEMX) THEN
25077000            RESIZE(ITEM X, Y + 512, RETAIN);
25077200          ITEMX[X] := OFFSET(IP);
25077400          SCAN R:P FOR X:M UNTIL = " ";
25077600          M := N - K;
25077800          MAXL := MAX(MAXL, N);
25078000          IF REMAININGCHARS(IP) <= N + 1 THEN
25078200            RESIZE(ITEMS, SIZE(ITEMS) + 1800, RETAIN);
```

FIG. 5b

| | |
|---|---|
| 25078400 | REPLACE IP:IP BY P FOR N, 48"00"; |
| 25078600 | SCAN P:R FOR N:X WHILE = " "; |
| 25078800 | END; |
| 25079000 | END; |
| 25079100 | IF REAL(RD) ISNT 1 THEN RETURN(REAL(RD)); |
| 25079200 | IF SORTING THEN |
| 25079400 | QSORT (ITEMX, 1, X, CMP); |
| 25079600 | W := RM - LM + 1; |
| 25079800 | IF COL = 0 THEN |
| 25080000 | COL := W DIV (MAXL + MAX(GUT , 1)); |
| 25080200 | N := IF GUT = 0 THEN W DIV COL ELSE MAXL + GUT; |
| 25080400 | L := (X + COL - 1) DIV COL; |
| 25080600 | LM := TEXTSTART + LM - 1; |
| 25080800 | FOR J := 1 STEP 1 UNITL L DO |
| 25081000 | BEGIN |
| 25081200 | REPLACE BUF[TEXTSTART] BY " " FOR TEXTLENGTH; |
| 25081400 | FOR I := 0 STEP 1 UNTIL COL-1 DO |
| 25081600 | REPLACE BUF [I*& + LM] BY ITEMS [ITEMX [F(I, J)]] |
| 25081800 | OPN := OPN + 1; |
| 25082000 | RD := OUTP (1 & CB_INSERT CB_DISPOSITION, BUF); |
| 25082100 | IF RD THEN RETURN(REAL(RD)); |
| 25082200 | END; |
| 25082400 | END; |
| 25082450 | ERRXIT: |
| 25082500 | BUGZ(HBUG("MCOL", MCOL:=*)); |
| 25082600 | END MCOL; |
| 30000000 | |

FIG. 5c

```
(RON)EDITOR/MACROS ON LANG AT TRPROGB
Created 06/22/94, Printed Wednesday, 06/22/94  09:11  (32 records)
#%---------- TEMPORARY MACROS ------------------
# DEF PRINTX <L1>,<L2>
]LABEL <L1> PRINTX1
]LABEL <L2> PRINTX2
]PRINT M PRINTX1 - PRINTX2
]CANCEL LABEL PRINTX1
]CANCEL LABEL PRINTX2
#%------------ PRINT <group> ------------------ PRINTX
#DEF SAVEX <L1>,<L2>,<FILE>
]LABEL <L1> SAVEX1
]LABEL <L2> SAVEX2
]SAVE M SAVEX1 - SAVEX2 AS <FILE>
]CANCEL LABEL SAVEX1
]CANCEL LAVEL SAVEX2
#%------------ SAVE <group> ------------------- SAVEX
#DEF LISTX <FILE>,<L1>,<L2>
]LABEL <L1> LISTX1
]LABEL <L2> LISTX2
]LABEL <FILE> LISTX1 - LISTX2
]CANCEL LABEL LISTX1
]CANCEL LABEL LISTX2
#%------------ LIST <group> ------------------- LISTX
#DEFINE SI <FIG>,<STATUS>: OPT 1,CONT %
]TERM TWO OFF
]R SCREENPRINT 2:SI <FIG> IN ED/DUMP OF MY/SEMINARS/FIG; %
     TASKSTRING-"            <STATUS>"
]TERM TWO
#%     ------ RUN SCREENPRINT: SI ----------------- SI
#%-------------------------------------------------
#%-------------------------------------------- TRANSFORMS
#TRANSFORM = IN OBJECT/MY/TRANSFORMS
#TRANSFORM = IN SL EDITORSUPPORT
                                          └─ 700
```

FIG. 7

METHOD AND APPARATUS FOR EXTENDING THE CAPABILITY OF A SYSTEM EDITOR USING HIGH-LEVEL LANGUAGE TRANSFORMS

FIELD OF THE INVENTION

The present invention generally relates to system editors and, more particularly, it relates to extending the command set of system editors.

BACKGROUND OF THE INVENTION

A system editor is a mechanism employed by computer users to create files and manipulate text in those files for computer applications such as word processing and computer programming. Examples of editing include adding, deleting, or rearranging text in a file. Generally, these editing functions are accomplished by way of a core set of commands which exist for the editor. In many applications, however, a user may desire to extend that core set of commands with new commands to make his particular editing task easier.

When one type of system editor is in use, a prompt line allows the user to either enter text into the designated file or to enter a command to be executed. Typically, it is the first character entered on the prompt line which distinguishes text from a command, for example, a command will begin with a command character such as "]".

One way of extending a system editor is by macros. Macros are commands which are expressed in terms of existing editor commands (e.g., core commands, or other macros). When invoked by a user, macros are interpreted by the editor. Macros are very useful when a user needs to instruct the editor to perform a common sequence of commands frequently.

Macros, however, have several disadvantages. First, they are limited by the set of core commands of the system editor. Second, macros tend to execute slowly.

Another way to extend the capability of a system editor is for an individual user to revise the actual system editor program to add more core commands, thus, creating his own version of the system editor. This, however, requires a non-trivial understanding of how the system editor functions and how all the code is interrelated. That is, creating individually tailored editors tends to increase the complexity of the system editor program.

SUMMARY OF THE INVENTION

The present invention relates to a system and a method for extending the editing capability in a programming environment of a computer system. Using this method, a library of editing commands, separate and distinct from the core set of standard editor commands, is created and expressed in a high level programming language. An interface is provided in the system editor to access the library of editing commands that are separate and distinct from the core set.

BRIEF DESCRIPTION OF THE DRAWINGS

The aspects, features and advantages of the present invention will be more readily understood from the following detailed description when read in conjunction with the accompanying drawings, in which:

FIG. 2 is a screen display of exemplary core commands associated with an exemplary system editor.

FIG. 3a is a screen display of exemplary commands such as macros and transforms used to extend the system editor.

FIG. 3b is a screen display of a listing of an exemplary macro used to extend the system editor.

FIG. 4a is a partial listing of the macro "MACUPCASE" which converts lowercase letters to uppercase letters.

FIG. 4b is a computer code listing of the transform "UPCASE" which converts lowercase letters to uppercase letters.

FIGS. 5a, 5b and 5c are a computer code listing of the transform "MCOL" which arranges the items within a group of lines into multiple columns.

FIG. 7 is a partial listing of an editor/macros file which is checked by the system editor to access the transforms.

DETAILED DESCRIPTION

OVERVIEW

The present invention is directed to extending the commands and, consequently, the capability of a system editor. Rather than extending the capabilities of a system editor with existing editor commands, as in the use of macros, the present invention enables the user to extend the editor using new commands, called transforms. The transforms are written in a standard high level language. A high level language is a programming language that does not reflect the structure of any one given computer or that of any given class of computers, such as ALGOL, C, COBOL, FORTRAN, or PASCAL. This facilitates translation of a computer program written in the high level language into several different machine codes.

Figure 1A:
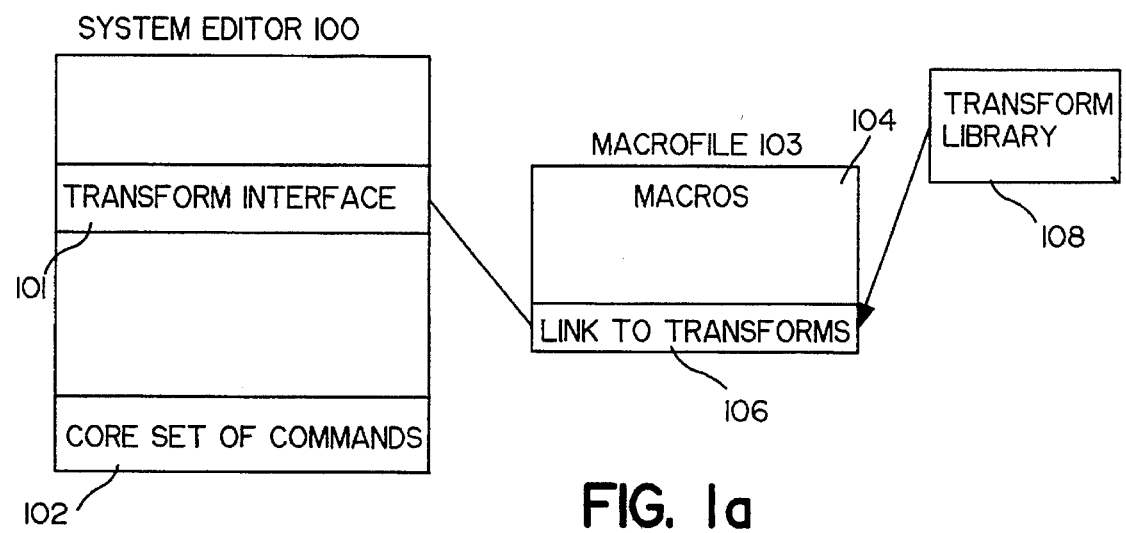
FIG. 1a is a high level functional diagram of an exemplary embodiment of the present invention.

A transform is a new type of command that may be added to a system editor. Referring to FIG. 1a, the transform command is created, compiled, and then stored in a library 108. An interface 101 and a core set of commands 102 are incorporated into the system editor 100. In the exemplary embodiment of the present invention, a link 106 resides in a macrofile 103 which also contains macros 104. The link 106 is provided between the system editor 100 and the library 108 such that when a transform command is called, the compiled transform is retrieved from the library 108 and executed. Therefore, a transform may be faster than a macro. Transforms are designed so that, to the user, they operate like normal editor commands.

Transforms may be written for a specific user or group of users. General transforms are those that would be beneficial to most users of the system. Therefore, these transforms are stored in a system-wide library. User-specific transforms are those that would be beneficial only to certain users or smaller groups of users. As a result, these transforms are stored in private libraries and may be accessed only by the intended users. Therefore, multiple libraries may exist to store transforms, and a particular user may have simultaneous access to more than one transform library.

Transforms are designed such that they accept records as input, operate on the content of the inputted records and deliver records as output. The system editor continues to maintain control, and hence the integrity, of the retrieval and storage of each record.

Extending a system editor using transforms can provide faster and more powerful operation of the system editor. Furthermore, transforms give a user greater flexibility to extend a system editor because of the use of a high level language to write the new commands.

Figure 1B:
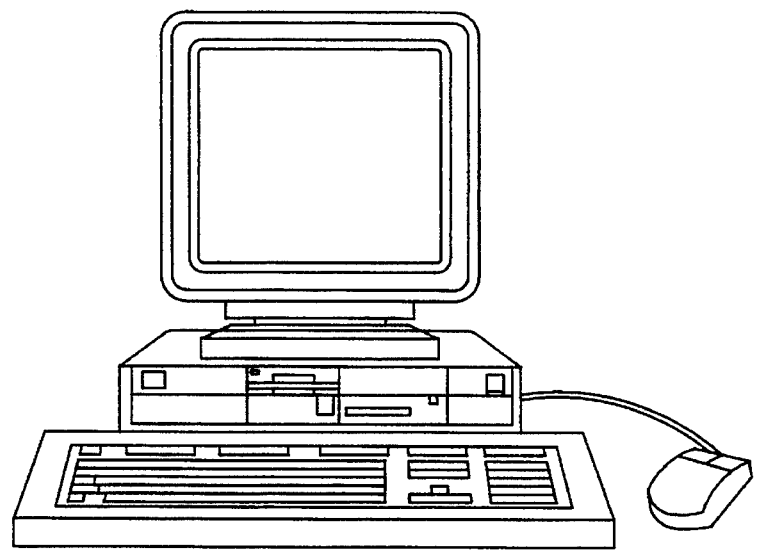
FIG. 1b is a block diagram of a personal computer (PC) on which the present invention may be implemented.
Figure 1C:
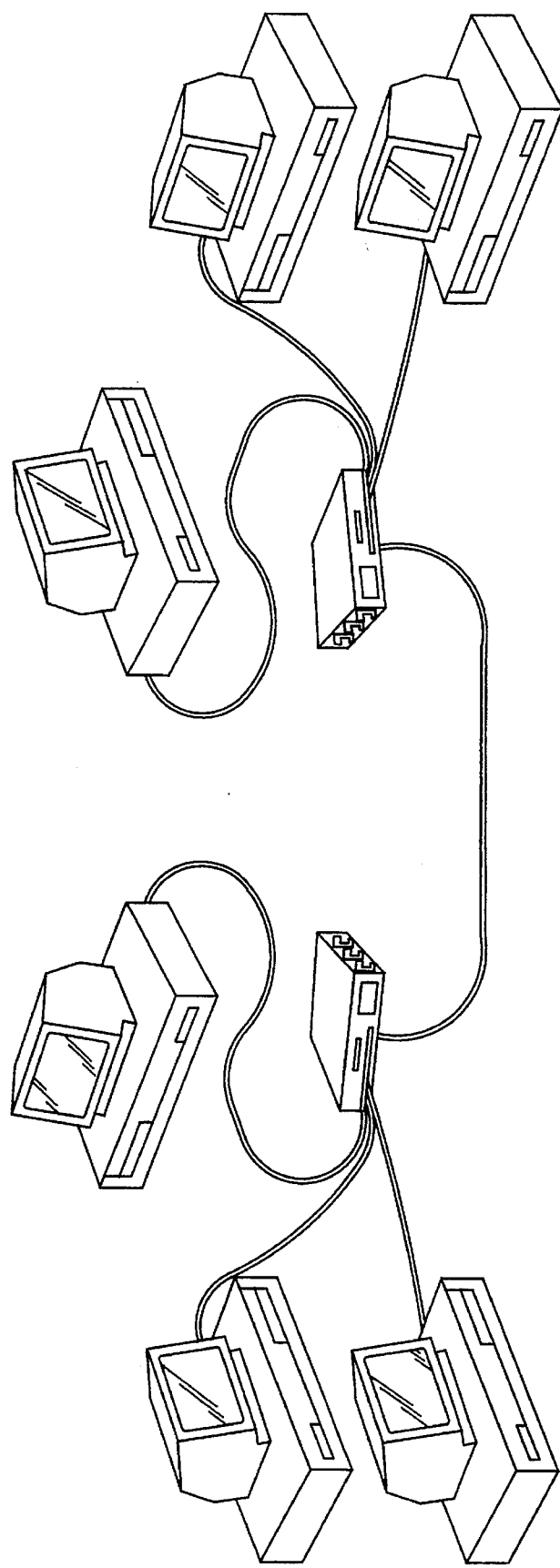
FIG. 1c is a block diagram of a network computer system on which the present invention may be implemented.
Figure 1D:
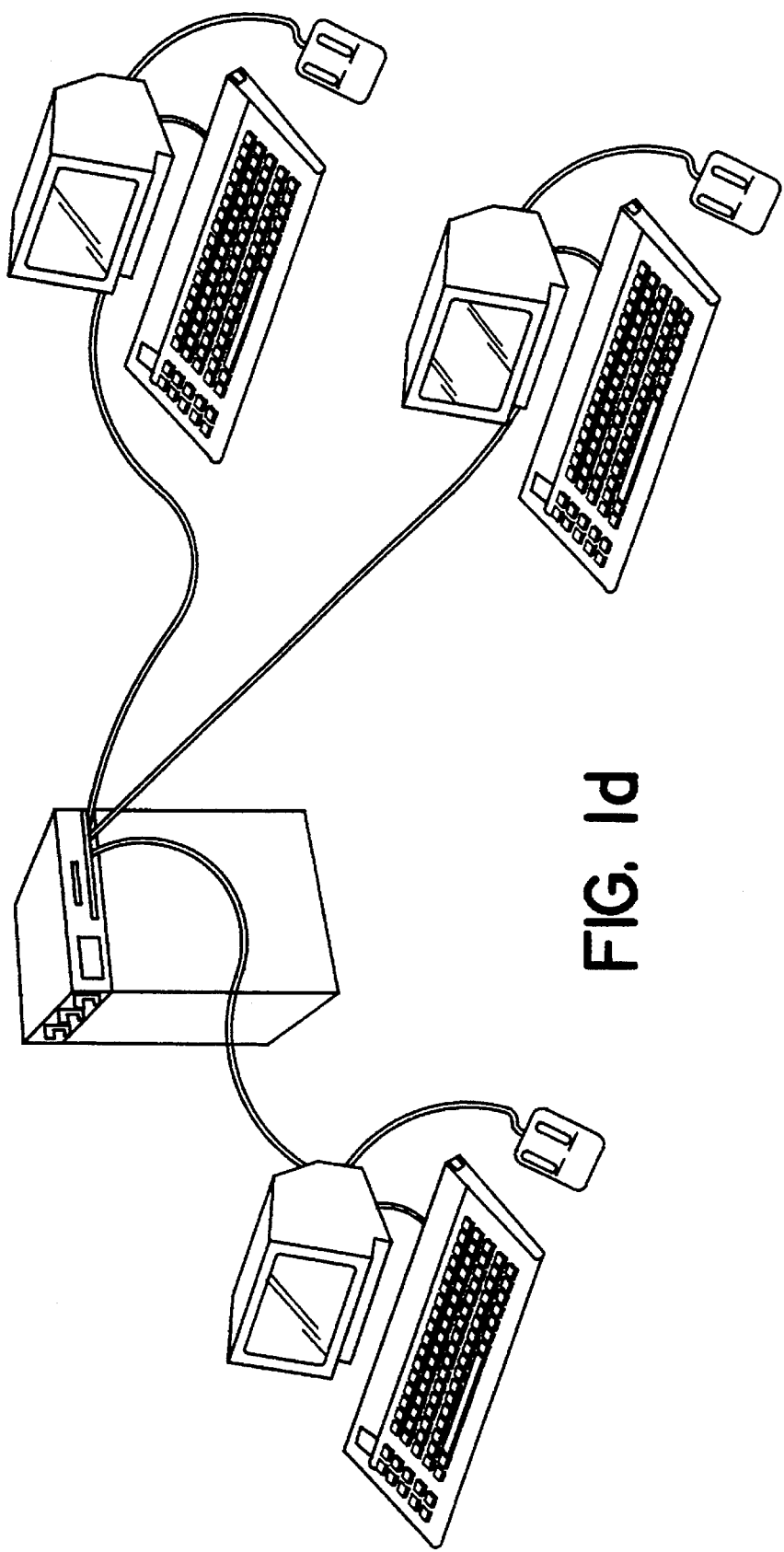
FIG. 1d is a block diagram of a large computer system on which the present invention may be implemented.

The present invention can be adapted for any editor, such as those used for word processing applications or those used particularly to compose and edit computer programs. Furthermore, the present invention can be implemented on many types of computer systems including a typical PC as shown in FIG. 1*b*, a typical network computer system as shown in FIG. 1*c*, or larger computer systems such as workstations, minis and mainframes as shown in FIG. 1*d*.

EXEMPLARY EMBODIMENT OF THE PRESENT INVENTION

System Editor

As discussed in the BACKGROUND, system editors are developed with a core set of commands. FIG. 2, for example, shows a list of typical editor commands built into a system editor. These commands are programmed into and compiled along with the system editor program. Typical commands included in a system editor are those that the user requires to operate the system editor as well as some very basic commands that make the editor more convenient to use. For example, commands such as "DELETE" 200, "FIND" 202, and "MOVE" 204 may be necessary to operate the editor, whereas commands such as "COMPILE" 206, "HELP" 208, and "RUN" 210 may not be necessary to operate the editor, but may make using the editor more convenient.

Macros

As mentioned, within the exemplary embodiment of the present invention, there is a standard set of commands as shown in FIG. 2. These commands are built into the code of the system editor.

In addition to using the core commands, a user of the system editor may create macros. FIG. 3*a* is a screen display of exemplary commands such as macros and transforms used to extend the system editor. Macros are constructed of existing commands and are used to execute a sequence of core commands, macros and/or transforms that are used frequently in combination with one another.

To create a macro for the system editor, a user creates a new macrofile or opens an existing macrofile, and edits that macrofile. This is accomplished, for example, as shown in the macrofile listing in FIG. 3*b*. In this macrofile, core command "GO" 212 and "FIND" 202 (see FIG. 2) are combined to create the macro "FF" 300. "FF" is an abbreviation for 'find first' (FF) which finds the first occurrence of a user selected character string.

Transforms

Transforms, like macros, extend the capability of system editors by supplementing available commands.

A transform is typically used to perform functions not available through the use of macros. However, because transforms may operate faster than macros, sometimes a transform is programmed to perform a function which can be accomplished with a macro.

To describe transforms and, at the same time, illustrate the difference between macros and transforms, the function of converting the lowercase letters in a record to uppercase letters, has been programmed as both a macro (FIG. 4*a*) and a transform (FIG. 4*b*).

Figure 4C:
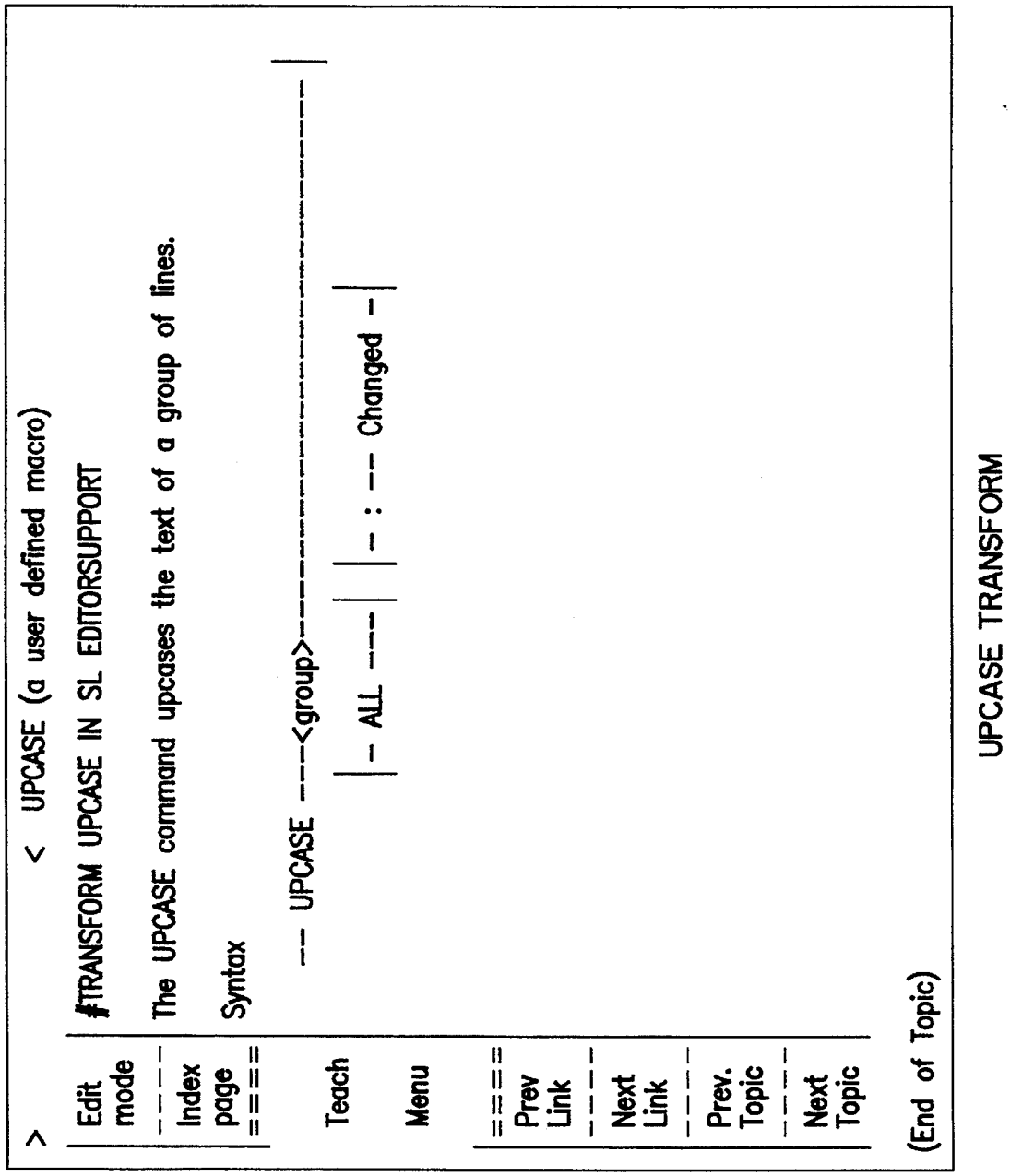
FIG. 4c is a screen display of an exemplary HELP text for the "UPCASE" transform shown in FIG. 4b.

FIG. 4*a* is a macrofile listing of the macro for performing case conversion—the MACUPCASE macro. And, FIG. 4*b* shows a computer code listing of the transform, UPCASE, for performing case conversion. It should be noted that, in the exemplary embodiment of the present invention, the system editor provides help text for most of the available commands. This help text provide general comments as well as specific comments regarding input and output parameters and command execution flow. For the UPCASE transform of FIG. 4*b*, FIG. 4*c* shows a screen display of an exemplary HELP text.

Referring back to FIG. 4*a*, in the macrofile listing for MACUPCASE, each lowercase alphabetical character that the macro receives is converted to uppercase. This is performed one character at a time. For example, in the first line of code 400 shown in FIG. 4*a*, each occurrence of the letter "a" in the selected group of lines is converted to "A". The second line of code 402 converts the character "b" to "B" in the same manner. Each subsequent line of code converts another letter to its uppercase equivalent until all letters in the selected text have been converted. This conversion is accomplished by using the standard editor command "REPLACE", shortened to "REP" in the code, 26 times in the macro.

Referring to FIG. 4*b*, in the computer code listing of the transform UPCASE, the procedure, written in ALGOL, converts lowercase text of one record to uppercase text. The editor calls this procedure for each record of the selected group. At line 25021400, the text of the current record is scanned to determine if it contains a lowercase letter. If so, all the letters in the record are uppercased in lines 25022000 and 25022200. At line 25022400, the editor is alerted that the record has been changed. If the record did not contain a lowercase letter, then at line 25022800, the editor is alerted that the record has not been changed. It should be noted that, in the exemplary embodiment of the present invention, the data portion of a record corresponds to one line of text in a file or approximately 72 text characters.

For purposes of efficiently using the hardware processor(s) executing the commands, the UPCASE transform executes more efficiently than the MACUPCASE macro and executes more quickly than its corresponding macro.

It should be noted that macros and transforms can be combined into new macros. However, although a macro can include transforms and other macros, a transform cannot include macros.

Types of Transforms

For purposes of classification, transforms can be divided into two types. The first type is referred to as the simple transform and the second type is referred to as the complex transform. The modifiers "simple" and "complex" refer to how the transform operates on the records inputted to the procedure as well as the programming complexity for each.

A simple transform operates on a single record and produces a single record as its output. For example, the above described UPCASE transform is considered a simple transform because for each record it receives it simply converts the lowercase letters to uppercase letters and returns the processed record. Because simple transforms return for output a processed version of the same record received as input, there is no concern that the processing may cause text (or characters) to overflow into another record.

A complex transform can operate on multiple records as its input and produce multiple records as its output, where the number of records input does not necessarily equal the number of records output. For example, the MCOL transform, whose computer code listing is shown in FIGS. 5a, 5b and 5c, arranges the items within a group of lines into multiple columns. The left margin, if not specified, will be the same as that in the first record of the group. The right margin, if not specified, will be the rightmost column of the record. The number of columns, if not specified, will be maximized. If the white space between columns (the "gutter") is not specified, the columns will be spread evenly across the record. The determination of these value occurs in the form of a CASE statement from lines 25067200 through 25073600. The actual executing portion of the code of the transform begins at line 25074200 with RECS (the number of records in the selected group) being greater than zero.

Accessing Transforms

Figure 6:
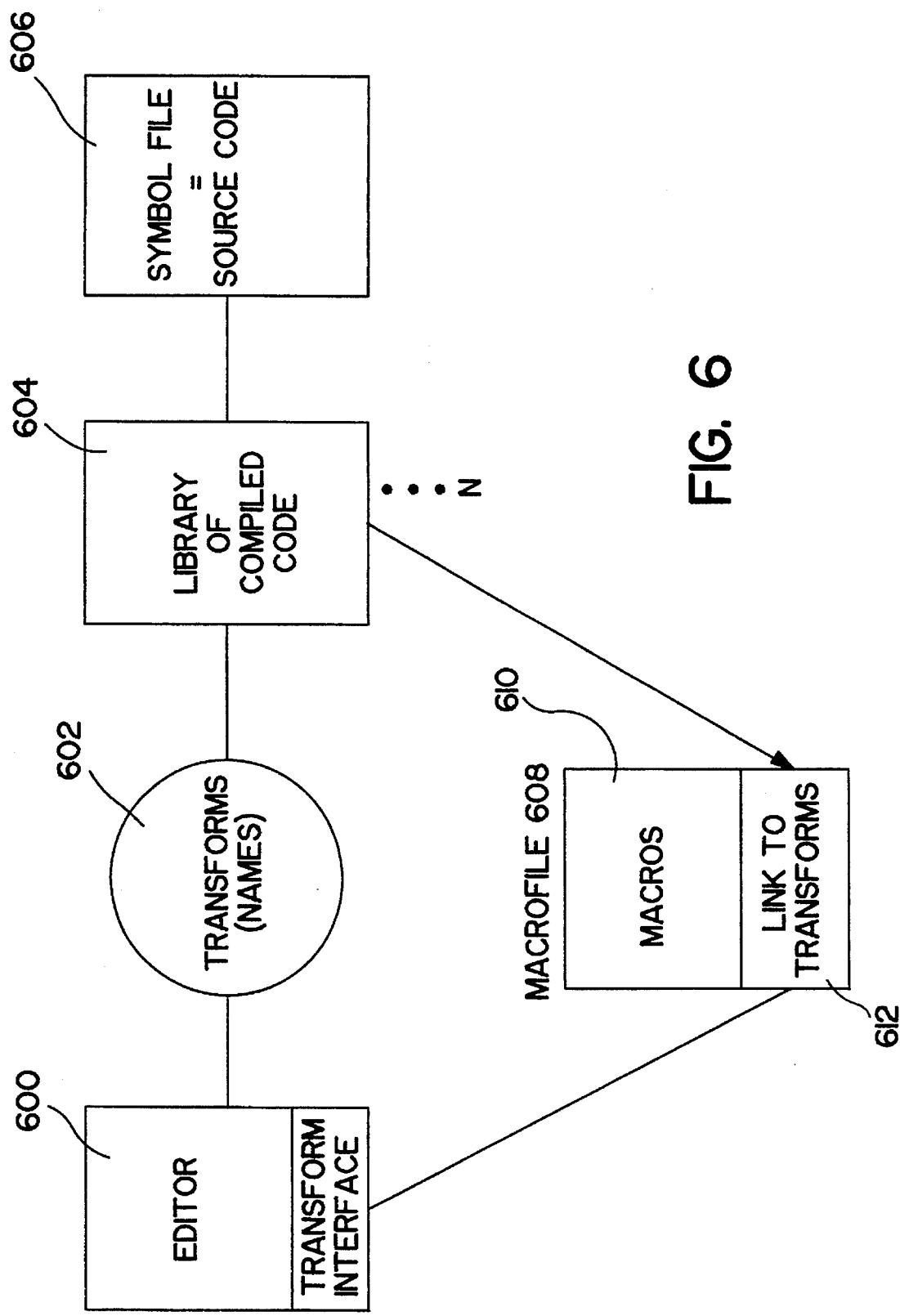
FIG. 6 is a high level functional block diagram of a system editor operating with transforms in accordance with the present invention.

FIG. 6 shows a high level system flow diagram illustrating how a system editor 600, in accordance with the present invention, can operate in conjunction with transforms.

For example, system editor 600 receives a transform command. System editor 600 accesses the compiled code of the transform stored in library 604 by way of matching the transform command with a list of transform names 602 in the symbol file 606. In the exemplary embodiment of the present invention, the system library includes the available transforms. For example, in the present invention, the system library is referenced by the designation EDITOR/MACROS. This macrofile 608 contains a listing of all available macros 610 (or some reference thereto) and a link 612 to the available transforms. This link to the transforms is at the end of the EDITOR/MACROS file as shown 700 in FIG. 7. Once a name match is found, the system editor knows the number of the transform to be called and, subsequently, calls the transform.

Figure 8A:
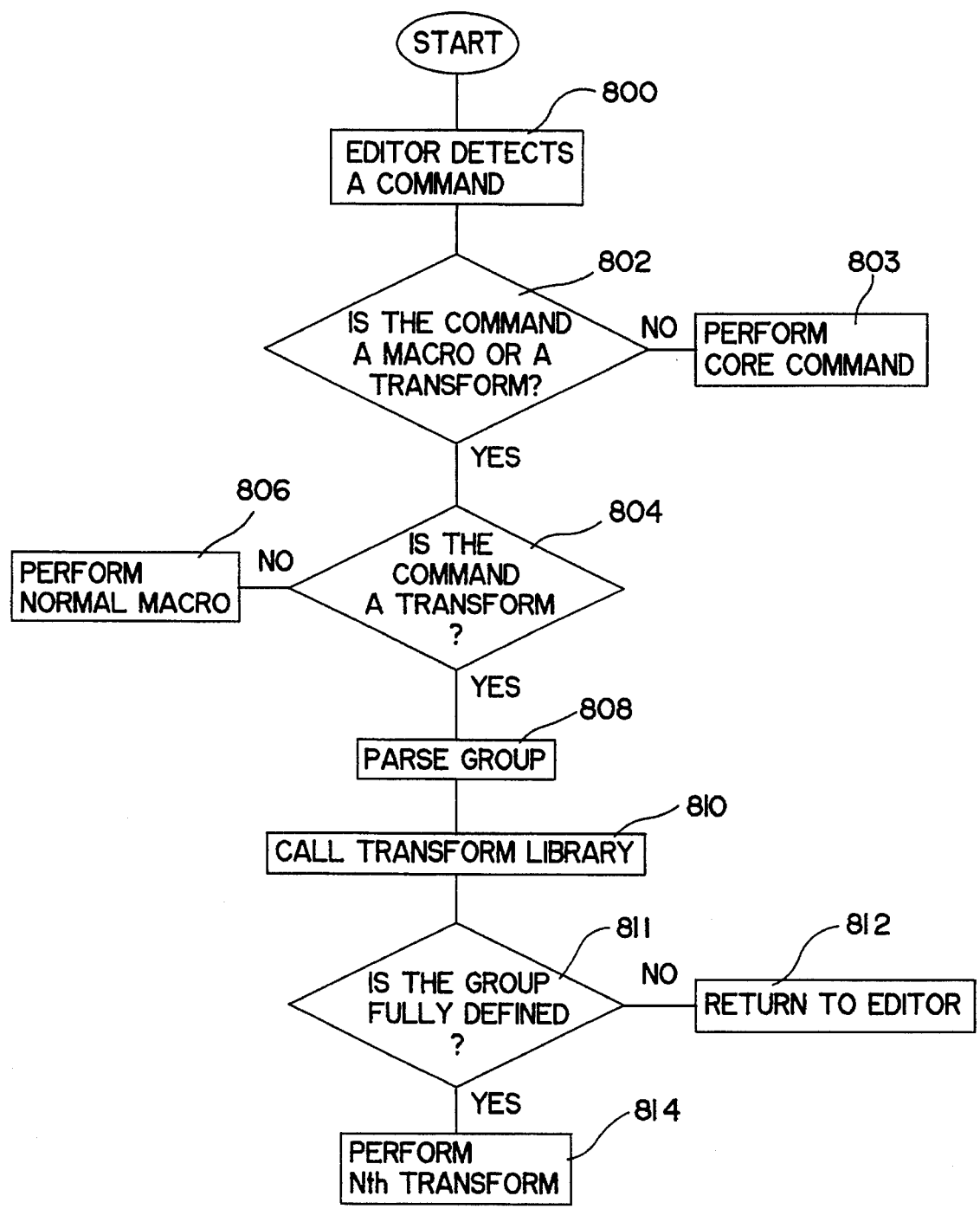
FIG. 8a is a flow diagram which illustrates the sequence of steps executed by a system editor when a user enters a command which is, for example, either a macro or a transform.
Figure 8B:
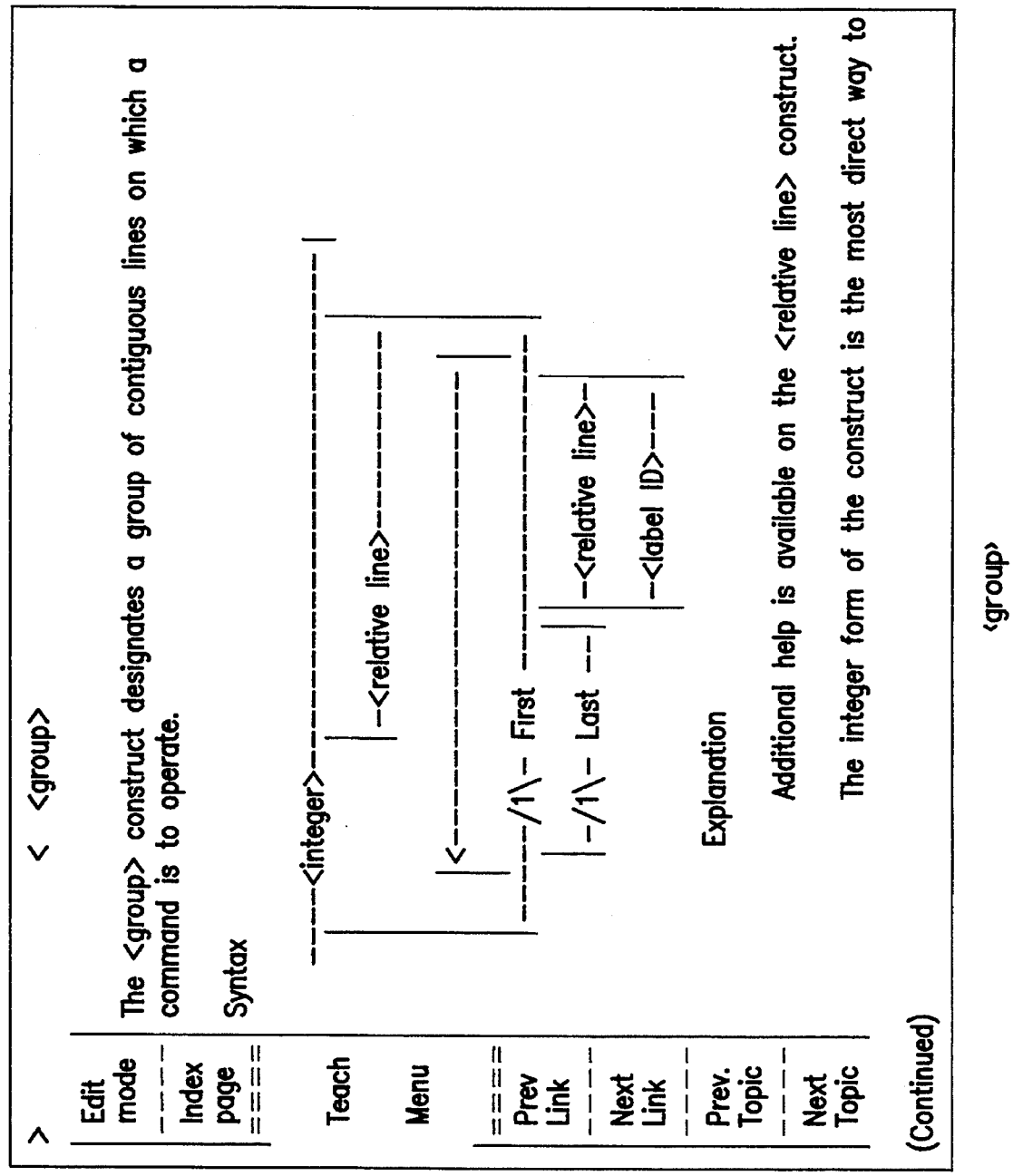
FIG. 8b is a screen display of an exemplary help text for GROUP which is used in selecting a set of records on which a core command, macro, or transform is to operate.

FIG. 8a shows a more detailed flow diagram illustrating the sequence of steps executed by system editor 600 when a user enters a command. As indicated in FIG. 8a, the command may be either a core command, a macro or a transform.

First, at step 800, the editor receives a command. In the exemplary embodiment of the present invention, user-entered commands, as opposed to user-entered text, are preceded by a right bracket character "]". Next, at step 802, system editor 600 then checks the macro list to determine if the entered command is a core command or if the command is on the macro list.(see FIGS. 3a and 7). If the command is a core command, then the core command is performed 803.

If the command is not a core command, at step 804 it is determined if the command is a macro or a transform. If the command is a macro, then control is passed to that part of system editor 600 which handles normal macro requests, step 806. Otherwise, if, at step 804, the user-entered command is determined to be a transform, then, at step 808, processing continues by parsing the group of records designated as inputs to the transform 808. The "group" for a transform is the same as for a core command and is illustrated and defined in the railroad diagram of Fibre 8b. Next, by way of the transform library at step 810, system editor 600 accesses the compiled code for the transform. At step 811, it is determined if the group has been fully defined. If not, control is returned to the editor 812. Otherwise, the appropriate transform is executed at step 814.

As indicated above with reference to FIG. 6, the system editor 600 accesses the transform not by name but rather by the number that the transform is in the compiled code. In the exemplary embodiment of the present invention, the system editor 600 needs to know the position of the transform in the file, so it goes into the library which has the transforms linked therein and gets the transform at that position. The editor accomplishes this by requesting the contents of the transform library and the namelist gets returned. The editor will then use the appropriate position in the namelist.

Specifically, in the exemplary embodiment of the system editor, the command "transform(O, . . . )" returns the namelist to the editor from the library.

Appendix A is a computer code listing of the system editor routine that is used to access the system transforms. The various transform libraries are defined in lines 46490700 to 46490840. The transform driver procedure is listed from lines 46491920 to 46493740. The library transform procedure is listed from lines 46495100 to 46496600. After the editor notes that the particular transform is in a particular position on the namelist, the editor calls, at line 46496500, the transformat that particular position from the transform library by the command "transform (position number, procedure driver, input, output)".

For example, the editor call "transform (3, driver, input, output)" would call the third transform in the library which, in turn, calls the driver (simple transform) or the input and the output (complex transform) procedures in the editor.

In other words, the operation of the simple transform subclass is as follows: the system editor determines the transform position from the namelist it previously obtained from the transform library; the system editor calls the transform library passing the selected transform (by position); this in turn calls the driver procedure passing it a procedure in the transform library that transforms one record; the driver then calls that procedure for each record in the selected group. Note that only driver procedure is used and the input and output procedures are not used.

The operation for the complex transform subclass is similar to that for the simple transforms, but the input and output parameters are used and the driver is not used.

It should be noted that, in the exemplary embodiment of the present invention, "driver", "input" and "output" are passed on every transform call even though they are not used in all cases. In the exemplary embodiment, this is so because system editor 600 does not know whether it is calling a simple transform (which uses 'driver') or a complex transform (which uses 'input' and 'output').

Figure 9A:
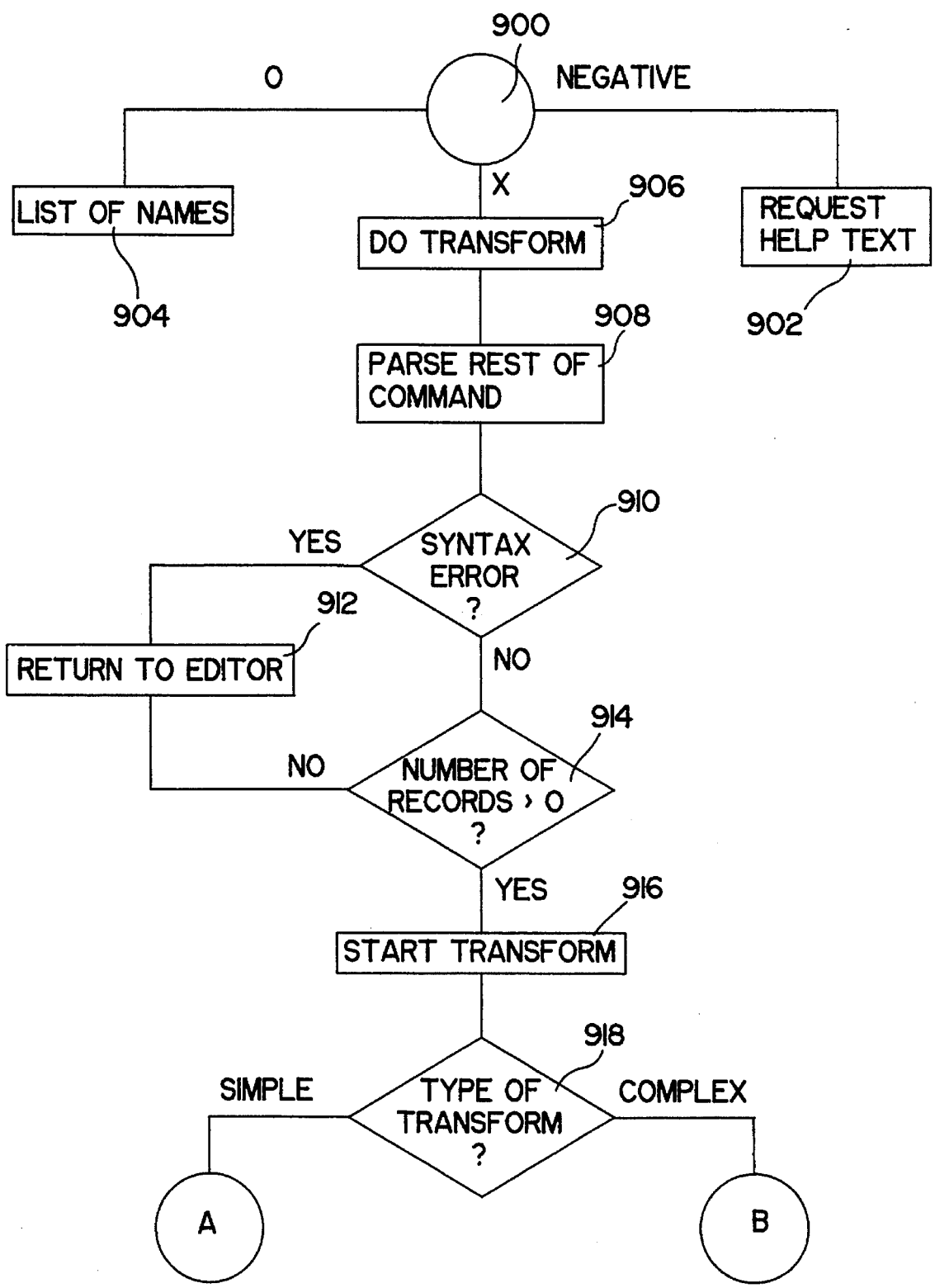
FIGS. 9a–9c are flow diagrams which illustrate an exemplary sequence of steps executed by the system editor when it has received a transform command.
Figure 9B:
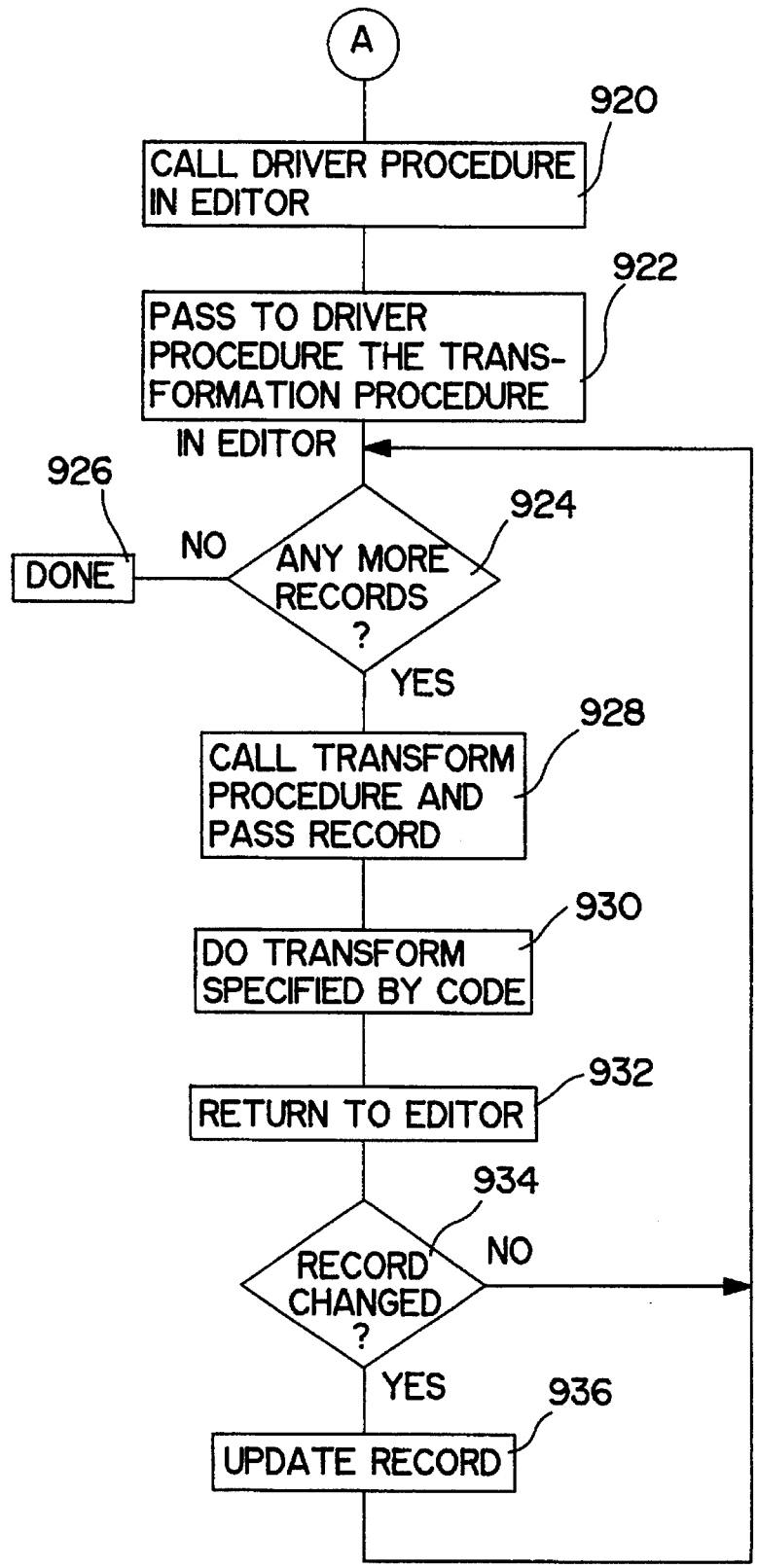
Figure 9C:
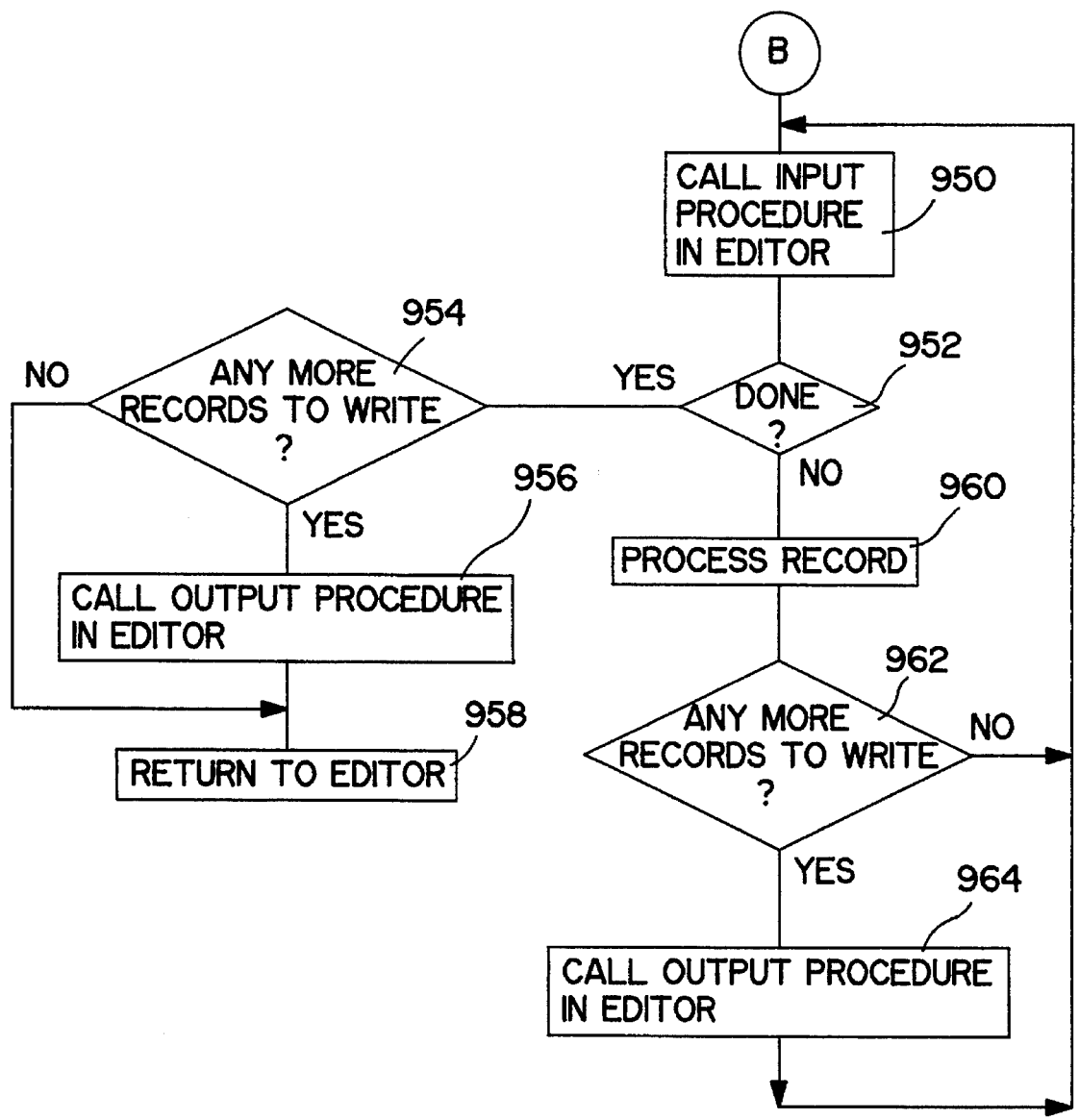

FIGS. 9a–9c show flow diagrams which illustrate an exemplary sequence of the steps executed by the transform library 604 when it is called by the editor 600. First, the selection parameter for the transform is examined 900. If the selection parameter is zero, then the list of transform names is returned to the editor 904. If the selection parameter is negative, then help text for the selected transform is returned to the editor 902. If the selection parameter is greater than zero, then the system prepares to execute the selected transform 906 and processing continues by parsing the options to the transform 908. The transform then checks for a syntax error in the received command 910. If a syntax error is detected, control passes back to the editor 912. Otherwise, there is no syntax error and the number of records is checked 914. If the number of records is greater than zero, the selected transform code is begun 916. That transform code is either simple or complex 918.

Referring to FIG. 9b, if the requested transform is simple, the driver procedure in the editor is called 920 passing it the procedure in the transform library that does the selected transformation of a single record 922. The driver procedure in the editor determines if there are any more records 924 and if there are none, the procedure is finished 926. If more records remain, the transform procedure is called and the record is passed 928. The transform specified by the code is performed 930 and control is passed back to driver procedure in the editor 932 with an indication whether the record was changed. If the record was changed 934, the updated record is written 936. Control loops back to determine if there are any more records 924.

Referring to FIG. 9c, if the requested transform is complex, the transform code calls the input procedure in the editor 950 to get the next record in the group. If there are no more records 952, the transform code determines if there are more records to write 954 and, if so, calls the output procedure in the editor 956 to write each record. Control is then returned to the editor 958.

If there are more records 952, the record is processed 960. If there are any more records to write 962, the output procedure in the editor 964 is called to write each record. Control loops back to get the next record 950.

Building the Transform Library

Appendix B is a computer code listing of the transform library <EDITOR/TRANSFORMS> in which the computer code for transforms such as the above-described UPCASE and MCOL reside. The procedure for transforms begins at line 20000000. UPCASE resides at lines 25020000 to 25023000 and MCOL resides at lines 25060000 to 25082600. The HELP text for the transforms is listed from lines 30000200 to 30021200.

In general, the following steps are followed to create a transform:

1) create a file to contain the transform code, e.g. EDITOR/TRANSFORMS, once created subsequent transforms can be added by simply editing this file;
2) add the name of the new transform being created to the namelist (see lines 00120000 and 35000000 of Appendix B);
3) write the procedure, in the high level language, that performs the function designated by the transform (see FIG. 4b for UPCASE and FIGS. 5a, 5b and 5c for MCOL);
4) create help text for each transform (optional); and
5) compile the file containing the transforms.

In summary, a method and system for extending the editing capability in a programming environment of a computer system has been described. In accordance with the principles of the present invention, a library of editing commands, separate and distinct from the core set of standard editor commands, is created and expressed in a high level programming language.

Although illustrated and described herein with reference to certain :specific embodiments, the present invention is nevertheless not intended to be limited to the details shown. Rather, various modifications may be made in the details within the scope and range of equivalents of the claims and without departing from the spirit of the invention.

What is claimed:

1. A computer-implemented method for extending editing capability of a system editor executing on a digital computer, the system editor having a core set of commands, the method comprising the steps of:

creating, in a high level programming language, a library separate from the system editor and core set of commands, the library containing at least one new editing command; and linking the system editor to the library to extend the editing capability of the system editor, wherein the high level programming language is one of ALGOL, C, COBOL, FORTRAN, and PASCAL.

2. The method of claim 1, wherein the step of linking further comprises the step of providing an interface in the system editor to access the library.

3. The method of claim 2, wherein the step of linking further comprises the step of providing a link file to allow access by the interface to a library.

4. The method of claim 3, wherein the step of creating further includes the step of creating a plurality of different libraries of new and different editing commands, wherein each one of a plurality of users may have access to any combination of the plurality of different libraries by way of the link file.

5. The method of claim 2, wherein the system editor, by way of the interface, accesses the new editing command with respect to a numerical position in the library.

6. A computer-implemented method for extending editing capability of a system editor executing on a digital computer, the system editor having a core set of commands, the method comprising the steps of:

creating, in a high level programming language, a library separate from the system editor and core set of commands, the library containing at least one new editing command and a namelist; and linking the system editor to the library to extend the editing capability of the system editor, wherein the step of linking further comprises the step of providing an interface in the system editor to access the new editing command with respect to a numerical position in the library, wherein the numerical position of the new editing command is determined by the namelist provided in the library, wherein the step of linking further comprises the step of providing a link file to allow access by the interface to a particular library; and the step of creating further includes the step of creating a plurality of different libraries of new and different editing commands, wherein each one of a plurality of users may have access to any combination of the plurality of different libraries by way of the link file.

7. The method of claim 6, further comprising the step of accessing the new editing command, wherein the step of accessing comprises the steps of:

linking the system editor to the library;

comparing the new editing command with the namelist;

determining the numerical position in the library of the new editing command from the namelist;

retrieving a set of compiled computer code at the numerical position for the new editing command; and executing the set of compiled computer code.

8. A system editor to be implemented on a computer having enhanced editing capabilities, comprising:

system editor means, having a core set of commands, for manipulating text in a file;

a library, created in a high level programming language, containing at least one new editing command separate from the core set of commands; and linking means for providing access by the system editor to the new editing command in the library, wherein the high level programming language is one of ALGOL, C, COBOL, FORTRAN, and PASCAL.

9. The editor of claim 8, wherein the linking means includes an interface means in the system editor and a link file for allowing the interface means to access the commands in the library.

10. The editor of claim 9, further including a plurality of different libraries containing new and different editing commands, wherein each one of a plurality of users may have access to any combination of the plurality of different libraries by way of declarations in the link file.

11. The editor of claim 8, wherein the system editor is expressed in a first high level language and the library is expressed in a second high level language different from said first high level language.

12. A system editor to be implemented on a computer having enhanced editing capabilities, comprising:

system editor means, having a core set of commands, for manipulating text in a file;

a library, created in a high level programming language, containing at least one new editing command separate from the core set of commands and a namelist; and linking means for providing access by the system editor to the new editing command in the library, wherein the linking means includes an interface means in the system editor for accessing the new editing command with respect to a numerical position in the library, wherein the numerical position of the new editing command is determined by the namelist provided in the library wherein the linking means further includes a link file for allowing the interface means to access commands in a particular library; and further including a plurality of different libraries containing new and different editing commands, wherein each one of a plurality of users may have access to any combination of the plurality of different libraries by way of declarations in the link file.

* * * * *